(12) United States Patent
Nishimura et al.

(10) Patent No.: US 9,475,587 B2
(45) Date of Patent: Oct. 25, 2016

(54) JIG FOR FORMING SEALANT LAYER FOR LIGHTNING PROTECTION FASTENER, METHOD FOR FORMING SEALANT LAYER FOR LIGHTNING PROTECTION FASTENER, AND WING OF AIRCRAFT

(71) Applicant: MITSUBISHI AIRCRAFT CORPORATION, Aichi (JP)

(72) Inventors: Wataru Nishimura, Tokyo (JP); Hideo Yamakoshi, Aichi (JP); Yuji Asahara, Aichi (JP); Atsuhiro Iyomasa, Tokyo (JP); Takeyasu Tarumi, Tokyo (JP); Noritomo Takata, Tokyo (JP); Jun Kawaguchi, Tokyo (JP); Hiroshi Rikukawa, Tokyo (JP); Tomonori Okumura, Aichi (JP); Kengo Nomiya, Tokyo (JP); Tooru Hashigami, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 431 days.

(21) Appl. No.: 14/165,734

(22) Filed: Jan. 28, 2014

(65) Prior Publication Data
US 2014/0209736 A1 Jul. 31, 2014

(30) Foreign Application Priority Data
Jan. 29, 2013 (JP) .................................. 2013-14091

(51) Int. Cl.
*B64D 45/02* (2006.01)
*F16B 37/14* (2006.01)

(52) U.S. Cl.
CPC ............... *B64D 45/02* (2013.01); *F16B 37/14* (2013.01)

(58) Field of Classification Search
CPC ...... B64D 45/02; F16B 37/14; F16B 33/004; F16B 5/02; F16B 19/02; B23P 11/00
See application file for complete search history.

(56) References Cited

U.S. PATENT DOCUMENTS

2012/0074257 A1    3/2012  Bessho et al.
2014/0373359 A1*  12/2014  Schomaker ............ B64D 45/02
                                                   29/897.2

FOREIGN PATENT DOCUMENTS

GB    WO 2012107741 A1 *   8/2012   ............ B64D 45/02
JP        2010-254287 A    11/2010

* cited by examiner

*Primary Examiner* — Jacob Cigna
*Assistant Examiner* — Lee A Holly
(74) *Attorney, Agent, or Firm* — Pearne & Gordon LLP

(57) ABSTRACT

To provide a jig for forming a sealant layer which enables to quickly and accurately form a sealant layer having a required film thickness. The jig includes: a sealant cup 13 that overlays a sealant 28 around a collar 26; a cup holder 12 that determines a position of the sealant cup 13 with respect to a fastener member 24; and a dummy cup 11 that determines a position of the cup holder 12 with respect to the fastener member 24. The cup holder 12 is determined in position with respect to the fastener member 24 by being guided along the dummy cup 11 determined in position with respect to the fastener member 24. The sealant cup 13 is guided along a guide of the cup holder 12 so as to overlay the sealant 28 around the collar 26 after removing the dummy cup 11 from the cup holder 12 determined in position with respect to the fastener member 24.

3 Claims, 6 Drawing Sheets

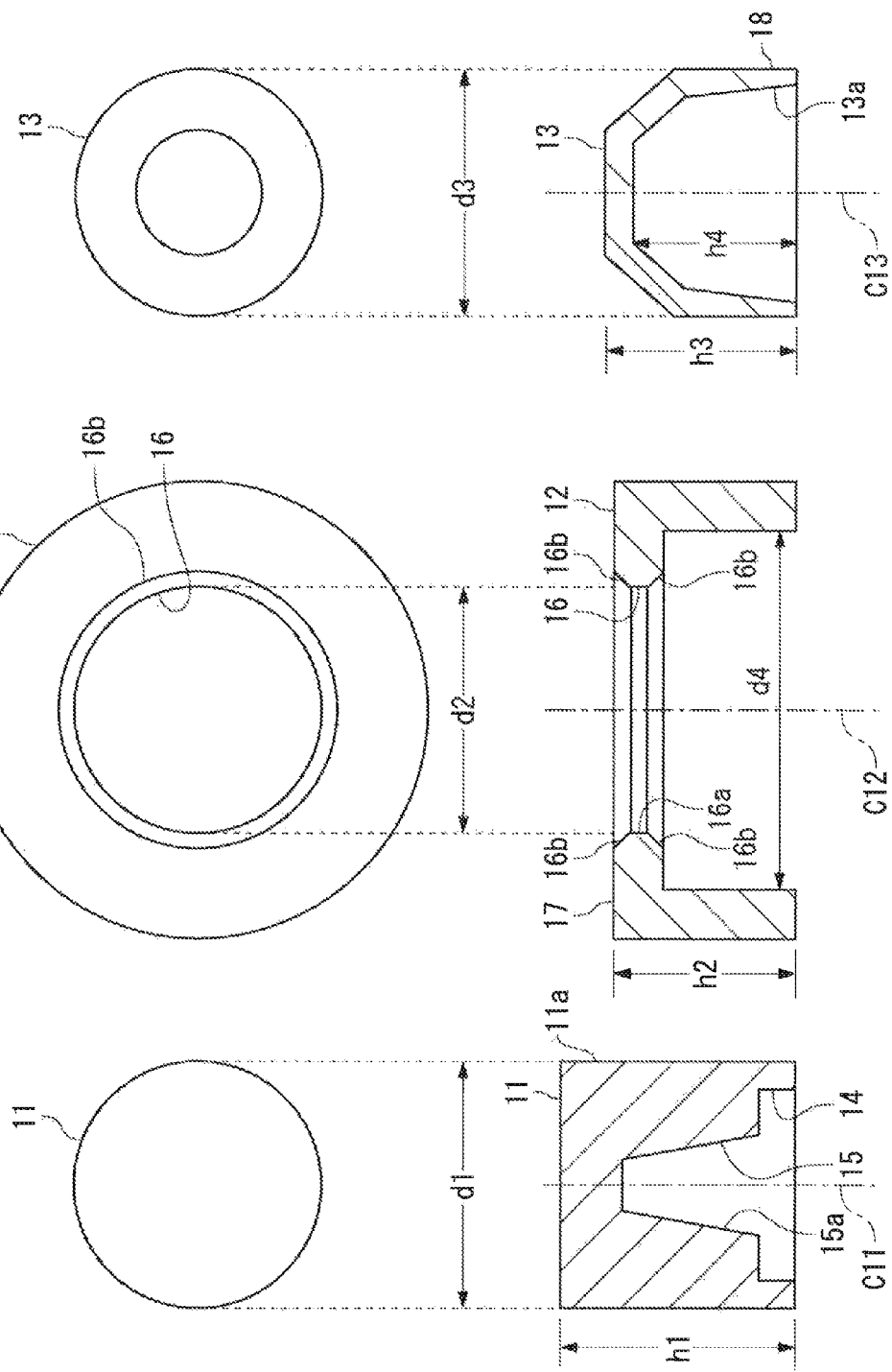

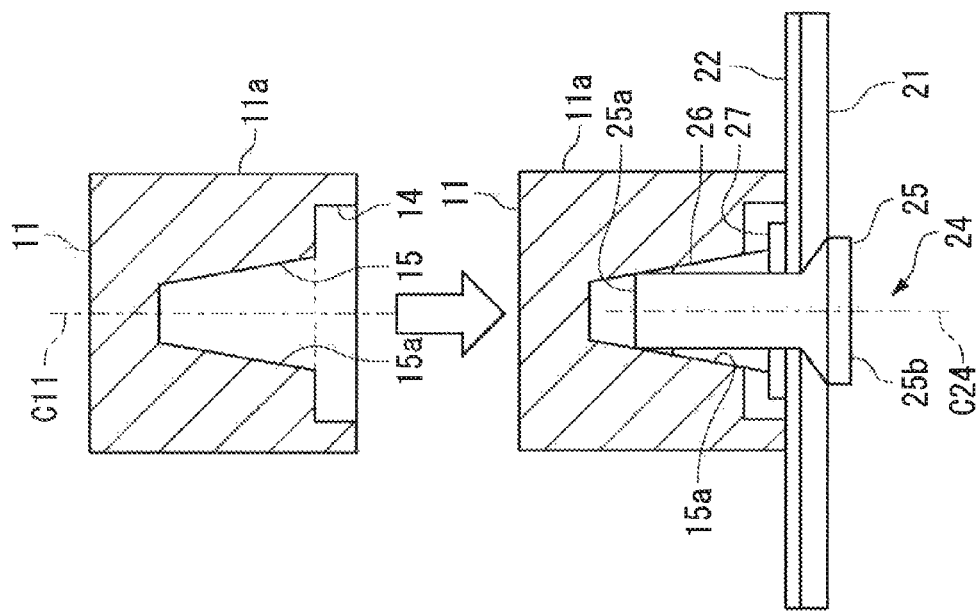
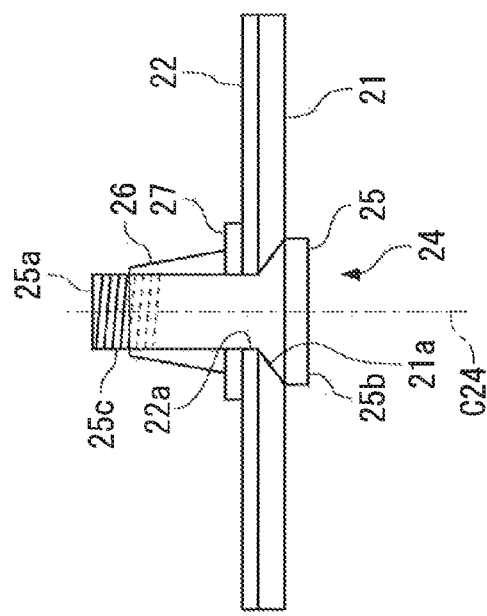

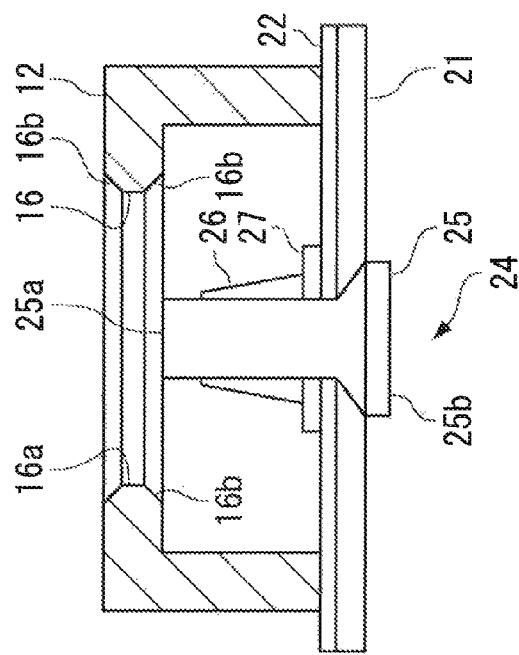
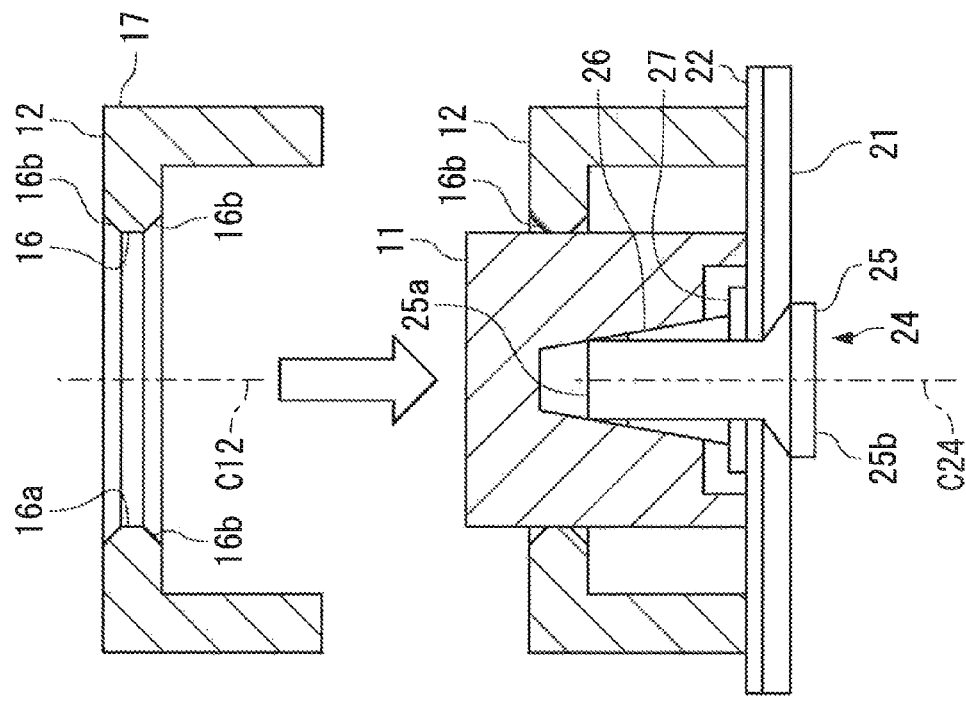
FIG. 3A
FIG. 3B

JIG FOR FORMING SEALANT LAYER FOR LIGHTNING PROTECTION FASTENER, METHOD FOR FORMING SEALANT LAYER FOR LIGHTNING PROTECTION FASTENER, AND WING OF AIRCRAFT

BACKGROUND OF THE INVENTION

1. Field of the Invention

The present invention relates to a jig for forming a sealant layer for a lightning protection fastener used in an airframe of an aircraft, and more particularly, used in a wing.

2. Description of the Related Art

In general, a wing constituting an airframe of an aircraft has a hollow structure. A wing panel forming a wing surface is fixed to a structural member inside of the wing by a fastener member.

The fastener member fastens the wing panel to the structural member by inserting a pin-shaped fastener body into through holes respectively formed in the wing panel and the structural member inside the wing from outside of the wing, and fixing a distal end portion of the fastener body by using a fixture such as a collar and a nut from inside of the wing.

A structural member other than the wing panel, a member for fixing accessories or the like are also fastened and fixed by the fastener member inside the wing or a fuselage portion.

In aircrafts, all possible lightning protection measures need to be taken by giving lightning protection capability to the fastener member.

That is, when aircrafts are struck by lightning and high current flows through the wing panel and the structural member of a main wing or the like, the high current partly or, in some cases, entirely flows through a fastened portion fastened by the fastener member including the fastener body and the fixture. If the current has a value exceeding a limit value of passage allowable current in each fastened portion, electric discharge called electric arc (or thermal spark) occurs (the electric discharge is referred to as arc below in the present specification). This is a phenomenon in which a rapid temperature rise occurs in a fastened interface between members mainly made of a conductive material and constituting the fastened portion due to the current passing through the fastened portion, thereby causing the members to locally melt, and electric discharge to occur in the surrounding atmosphere. In many cases, high-temperature melts called hot particles scatter from the melting portion.

An inner space of the wing generally doubles as a fuel tank. It is thus necessary to take explosion protection measures on the fuel tank so as to prepare for lightning strikes. When the above arc or hot particles have energy exceeding a certain level, the arc or hot particles could ignite fuel vapor in the fuel tank. Therefore, by suppressing the occurrence of arc or sealing the arc in the lightning strikes, the generated arc discharge needs to be prevented, and the hot particles scattering therefrom need to be prevented from contacting the flammable fuel vapor to thereby prevent ignition. Here, examples of a portion where the flammable fuel vapor possibly exists include an inner portion of the fuel tank inside the wing and inside the fuselage portion, an inner portion of a surge tank (where a vent scoop, a burst disk or the like are placed) generally placed on a wing tip side of the fuel tank, and an inner portion of fuel-system accessories.

As a method for sealing the arc, a configuration in which a cap made of an insulating material is attached so as to cover a required portion of a fastener member, an inner portion of the cap is filled with a sealant so as to fill a gap between the fastener member and the cap has been proposed (e.g., Japanese Patent Laid-Open No. 2010-254287). However, when the cap is mounted, a fastener portion for mounting is required. It is thus necessary to extend the length of a fastener body. Since a great number of fastener members are provided in an aircraft, the weight of the aircraft is increased. Fuel consumption is thereby deteriorated.

When the fastener member is attached to a narrow portion with a small space therearound, a space for mounting the cap may not be ensured.

A method for ensuring lightning protection capability by overlaying an insulating sealant layer on a fastener member without attaching the cap has been also applied. However, workers normally form the sealant layer based on visual observation. It is thus not easy to accurately form the sealant layer having a required thickness for ensuring the lightning protection capability around the fastener member.

In view of the above problems, a main object of the present invention is to provide a jig for forming a sealant layer for a lightning protection fastener which enables to quickly and accurately form a sealant layer having a required thickness around a fastener member.

SUMMARY OF THE INVENTION

To achieve the above object, the present invention provides a jig for forming a sealant layer for a lightning protection fastener, the lightning protection fastener comprising a fastener member that passes through and fastens a plurality of members constituting an airframe of an aircraft, and an insulating sealant layer that is formed around the fastener member. The jig includes a sealant cup, a cup holder, and a dummy cup.

The sealant cup is used for overlaying a sealant to be stored in a cavity on the fastener member.

The cup holder includes a guide for determining a position of the sealant cup with respect to the fastener member.

The dummy cup determines a position of the cup holder with respect to the fastener member.

The cup holder is determined in position with respect to the fastener member by moving the guide along the dummy cup determined in position with respect to the fastener member.

The sealant cup is moved along the guide of the cup holder so as to overlay the sealant around the portion to be insulated after removing the dummy cup from the cup holder determined in position with respect to the fastener member.

In accordance with the jig of the present invention, the sealant cup is mounted to the cup holder determined in position by using the dummy cup, so that the sealant cup can be determined in position with respect to the fastener member. Therefore, the sealant layer having a required film thickness can be quickly and accurately formed around the fastener member.

In the jig according to the present invention, the fastener member may pass through and couple a first member and a second member, and the sealant layer may be formed around the portion to be insulated of the fastener member projecting from one or both of the first member and the second member.

Lightning protection capability of the fastener member can be ensured by forming the sealant layer around the portion to be insulated.

In the present invention, the sealant cup and the dummy cup have any outer shape. When the sealant cup and the dummy cup have a circular shape, the sealant cup and the dummy cup can be mounted to the cup holder without considering a direction around an axis. Thus, the sealant cup may be a cylindrical member where the cavity opens at one axial end. In the cup holder, the guide may be an arc surface having a radius of curvature corresponding to an outer periphery of the sealant cup. The dummy cup may have a guided region corresponding to the outer periphery of the sealant cup supported by the guide.

In the guide of the cup holder according to the present invention, a chamfer may be formed on a side receiving the sealant cup and the dummy cup.

The chamfer functions as a guide when the cup holder is mounted toward the dummy cup, and when the sealant cup is mounted toward the cup holder, thereby smoothly mounting the cup holder to the dummy cup and the sealant cup to the cup holder.

In the present invention, a gap may be formed between the sealant cup and the cup holder when the sealant cup is mounted to the cup holder.

When the gap is formed between the sealant cup and the cup holder, a region where the sealant squeezes out can be ensured.

The guide of the cup holder according to the present invention may be a circular surface, or may be an arc surface having a radius of curvature corresponding to an outer diameter of the sealant cup and an outer diameter of the dummy cup, and having a center angle of 180° or more.

That is, if a sufficient space for the cup holder cannot be ensured, the arc surface having a center angle of 180°, i.e., a semicircular guide may be used. Of course, the arc surface having a center angle exceeding 180° may be used. Accordingly, the sealant cup and the dummy cup can be stably retained.

In the sealant cup according to the present invention, a thickness in a vicinity of the opening of the cavity may be smaller than that of a region axially away from the vicinity of the opening. The sealant in the cavity can be thereby easily caused to squeeze out.

In the sealant cup according to the present invention, a diameter of the cavity may be continuously or intermittently increased toward the opening. The sealant cup can be thereby easily removed after the sealant is cured.

The present invention also provides a method for forming a sealant layer by using the aforementioned jig.

The method includes: a first step of mounting the dummy cup to the fastener member; a second step of mounting the cup holder to the dummy cup by moving the guide along the dummy cup; and a third step of mounting the sealant cup to the fastener member while moving the sealant cup along the guide of the cup holder after removing the dummy cup with a relative position of the cup holder to the fastener member maintained.

A lightning protection fastener on which the sealant layer is formed as described above is typically used in a wing of an aircraft.

In the method according to the present invention, before the third step, a sealant is preferably fed into the cavity of the sealant cup in advance.

Since the sealant cup filled with the sealant in advance is overlaid on the fastener member, air can be pushed out of the sealant cup by the pressure of the sealant. Generation of voids can be thereby suppressed.

In the method according to the present invention, before the first step, the fastener member may be coated with another sealant having lower viscosity than the sealant to be fed into the sealant cup.

When the sealant having lower viscosity is applied in advance, the sealant supplied from the sealant cup flows without trapping air. Generation of voids can be thereby suppressed.

In accordance with the present invention, the sealant cup can be determined in position with respect to the fastener member by mounting the sealant cup to the cup holder determined in position by using the dummy cup. Accordingly, the sealant layer having a required thickness can be quickly and accurately formed around the faster member.

BRIEF DESCRIPTION OF THE DRAWINGS

FIGS. 1A to 1C are top views and sectional views of a jig used in a first embodiment: FIG. 1A shows a dummy cup; FIG. 1B shows a cup holder; and FIG. 1C shows a sealant cup;

FIGS. 2A and 2B are sectional views for explaining a first step in the first embodiment;

FIGS. 3A and 3B are sectional views for explaining a second step in the first embodiment;

FIG. 5A shows a dummy cup; and FIGS. 5B to 5D are sectional views showing a zero step to a first step; FIG. 6A shows a second step; FIG. 6B shows a third step; and FIG. 6C shows a fastener member on which a sealant layer is formed.

DETAILED DESCRIPTION OF THE PREFERRED EMBODIMENTS

Figure 4A:
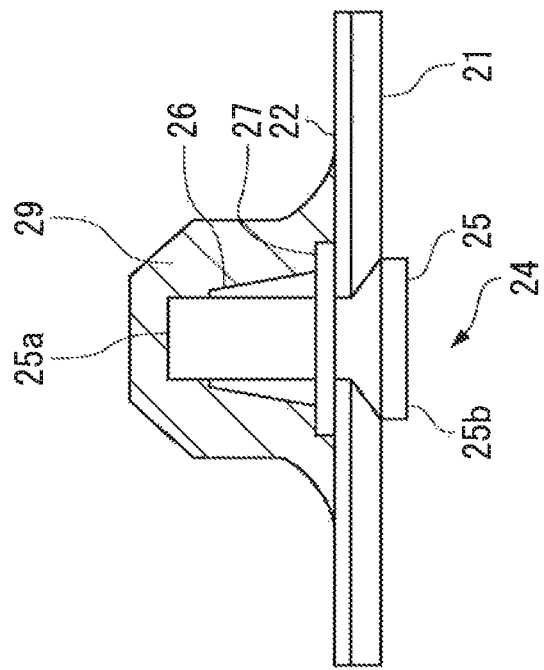
FIGS. 4A and 4B are sectional views for explaining a third step in the first embodiment.

In the following, preferred embodiments of the present invention are described by reference to the accompanying drawings.

First Embodiment

First, one example of a fastener member as an object of the present invention is described.

As shown in FIG. 2A, a fastener member 24 in the present embodiment joins a wing panel 21 (a first member) and a reinforcement structural member 22 (a second member) laminated on the wing panel 21. The wing panel 21 is arranged on an outer side of a wing of an aircraft, and the reinforcement structural member 22 is arranged on an inner side of the wing.

The fastener member 24 includes a pin-shaped fastener body 25, a collar 26 having a conical frustum shape that is mounted to a shank portion 25a of the fastener body 25 on the inner side of the wing, and a washer 27 made of an insulating material.

In the present invention, a bolt may be used instead of the pin-shaped fastener body 25, and a nut meshing with the bolt may be used instead of the collar 26 so as to constitute the fastener member. That is, the fastener member according to the present invention has a concept in which one of the members includes a shank portion, and the other of the members includes a fixture mounted to the shank portion in any specific form.

The fastener body 25 and the collar 26 are generally made of a metal material such as titanium alloy in view of strength. The fastener body 25 includes the shank portion 25a around which a thread groove 25c is formed, and a tapered head portion 25*b* that is provided at one end portion of the shank portion 25*a* and has a wider diameter than the shank portion 25*a*.

The washer 27 has an annular shape with a predetermined thickness, and is normally made of a metal material. When the metal material is used for the washer 27, stainless steel, aluminum or the like are used.

A coating is normally applied to a surface of the metal member such as the fastener body 25, the collar 26, and the washer 27. For example, when an anodized coating is applied, anticorrosion properties are maintained, and lubricity in tightening is improved. When a conductive chemical coating is applied, anticorrosion properties are maintained, and conductivity is improved so as to prevent occurrence of arc and improve static electricity removal performance.

When the washer 27 is made of an insulating material, arc discharge can be more effectively prevented from occurring in an interface between the reinforcement structural member 22 and the washer 27. However, the strength is lowered. It is thus necessary to make consideration of structural design. When the insulating material is used for the washer 27, resin having insulating properties, such as PPS (polyphenylene sulfide resin), polyimide, PEEK (polyether ether ketone resin), and nylon resin, is preferably used.

The fastener body 25 is inserted from the outer side of the wing (a lower side in the drawing) into holes 21*a* and 22*a* respectively formed so as to pass through the wing panel 21 and the reinforcement structural member 22. The shank portion 25*a* projects into the wing with the head portion 25*b* abutted against a surface of the wing panel 21 around the hole 21*a*.

In this state, a distal end portion of the shank portion 25*a* of the fastener body 25 projects longer into the wing than the collar 26. The shank portion 25*a* projecting into the wing together with the collar 26 is covered with a sealant layer 29 made of an insulating material so as to prevent occurrence of arc (see FIG. 4B).

The sealant layer 29 is desired to have a required thickness so as to ensure lightning protection capability. If the sealant layer 29 does not have a predetermined thickness for ensuring the lightning protection capability, that is, if the arc preventing means has insufficient performance and arc occurs by lightning current on a contact surface between the fastener member 24 and another peripheral member, the arc cannot be sealed. The arc itself, or hot particles generated from the arc may destroy the sealant layer 29 to blow out, come into contact with flammable fuel vapor, and thereby cause ignition. The sealant layer 29 is destroyed when a bulk portion of the sealant tears or melts, or when the sealant layer 29 is separated at a close contact surface between the sealant layer 29 and an inner surface 22*b* of the reinforcement structural member 22 to cause the hot particles to blow out. The required thickness of the sealant layer 29 is, for example, about 0.8 mm to 3.0 mm since the thickness needs to be set so as to sufficiently withstand the magnitude of lightning current flowing through each fastened portion. The required thickness differs in respective portions even around the same fastener member 24.

When the sealant layer 29 is formed, it is necessary to prevent generation of voids within the sealant layer 29 as much as possible. If there are a lot of voids in the sealant layer 29, the arc sealing performance is reduced, and the lightning protection capability is also deteriorated. Since there are a great number of fastener members 24 in the wing of the aircraft, it is necessary to reduce a time required for forming the sealant layer 29 for each of the fastener members 24.

First, to form the sealant layer having a required thickness around the fastener member 24, a predetermined amount of sealant is required. However, it is not easy to accurately apply the predetermined amount of sealant to the fastener member by using a device such as a seal gun.

Thus, in the present embodiment, a sealant cup 13 including a cavity 13*a* that stores an uncured sealant 28 is used as shown in FIG. 1C.

To form the sealant layer having a required thickness, the cavity 13*a* needs to have an outer diameter and a depth enough to ensure the required thickness with respect to an outer diameter and a projecting length of the fastener member 24. A study on this point is described in detail later. It is a premise that the sealant 28 for coating does not become insufficient. To this end, the sealant 28 is fed so as to fully fill the cavity 13*a* of the sealant cup 13 in principle. In some cases, however, the amount of the sealant 28 in the cavity 13*a* is reduced as described later.

The required thickness may not be obtained only by identifying the outer diameter and the depth of the cavity 13*a*, and the amount of the sealant 28 fed into the cavity 13*a*. That is, the required thickness may not be obtained when a center axis of the cavity 13*a* and a center axis of the fastener member 24 are not matched with each other. It means that the center axis of the cavity 13*a* may be laterally displaced, or may be inclined.

Thus, the center axis of the cavity 13*a* is made coaxial with the center axis of the fastener member 24. That is, when the respective center axes are aligned, the cavity 13*a* forms an axisymmetric rotating body with respect to the center axis of the fastener member 24. However, it requires considerable skill to directly overlay the sealant cup 13 on the fastener member 24 with the center axes aligned with each other.

In the present embodiment, the sealant cup 13 is determined in position and retained by using a cup holder (FIG. 1B) arranged coaxially with the fastener member 24. As the premise, the cup holder 12 needs to be arranged coaxially with the fastener member 24. Thus, a cup as a dummy of the sealant cup 13 (a dummy cup 11: FIG. 1A) is mounted to the fastener member 24 in advance. The dummy cup 11 includes a guide surface 15*a* so as to be arranged coaxially with the fastener member 24. The cup holder 12 is mounted to the dummy cup 11, so that the cup holder 12 is determined in position coaxially with the fastener member 24.

The present embodiment proposes a method for quickly and accurately forming the sealant layer 29 having a required thickness by use of three types of jigs of the dummy cup 11, the cup holder 12, and the sealant cup 13. The method is performed on the fastener member 24, the assembly of which is completed except for the sealant layer 29.

First, the three types of jigs used in a first step to a third step described later are described by reference to FIGS. 1A to 1C.

[Dummy Cup 11]

The center axis of the fastener member 24 is identified in relation to the dummy cup 11 by mounting the dummy cup 11 to the fastener member 24 (the collar 26 and the shank portion 25*a* exposed from the collar 26) in a first step.

As shown in FIG. 1A, the dummy cup 11 includes a cylindrical body 11*a* that is closed at one axial end, and opens in a first airspace 14 at the other axial end, the first airspace 14 formed in the body 11*a*, and a second airspace 15 communicating with the first airspace 14. The body 11*a*, the first airspace 14, and the second airspace 15 are formed so as to be aligned with a center axis C11. An outer diameter (diameter) d1 of the body 11*a* is set to be equal to an inner diameter d2 of a retention hole 16 in the cup holder 12 and an outer diameter (diameter) d3 of the sealant cup 13 described below.

The first airspace 14 receives the washer 27 in a state in which the dummy cup 11 is mounted to the fastener member 24. The first airspace 14 has an enough diameter for receiving the washer 27.

The second airspace 15 receives the collar 26 and the shank portion 25a exposed from the collar 26 in a state in which the dummy cup 11 is mounted to the fastener member 24. An inner peripheral surface of the body 11a defining the second airspace 15 forms the guide surface 15a. The guide surface 15a contacts a side surface of the collar 26. The guide surface 15a is inclined at an angle equal to the side surface of the collar 26. Therefore, the center axes of the dummy cup 11 and the fastener member 24 can be matched with each other by mounting the dummy cup 11 to the fastener member 24.

An outer peripheral surface (a cylindrical surface) of the dummy cup 11 forms a guide surface that is guided along and supported by a guide surface 16a of the cup holder 12.

The dummy cup 11 can be made of a metal material such as aluminum alloy, or a resin material such as fluorine resin.

A height h1 of the dummy cup 11 is set to be greater than a height h2 of the cup holder 12 described below. This is to engage the cup holder 12 and the dummy cup 11 in the retention hole 16.

The height h1 is preferably set in consideration of a grip portion for use in removing the dummy cup 11 from the cup holder 12.

[Cup holder 12]

The cup holder 12 is used for fixing the position of the fastener member 24, the center axis of which is identified by the dummy cup 11. The cup holder 12 is mounted around the dummy cup 11 in a second step.

As shown in FIG. 1B, the cup holder 12 is a cylindrical member, one axial end of which opens. A retention plate 17 is formed at the other end. The circular retention hole 16 is formed penetrating through the retention plate 17. An inner peripheral surface of the retention plate 17 defining the retention hole 16 forms the guide surface 16a.

The inner diameter d2 of the retention hole 16 is matched with the outer diameter d1 of the body 11a of the dummy cup 11. When the dummy cup 11 is inserted into the retention hole 16 and mounted to the cup holder 12, the guide surface 16a comes into contact with the outer peripheral surface (the guide surface) of the dummy cup 11. Then, the dummy cup 11, to which the fastener member 24 is mounted, and the cup holder 12 are determined in position such that the center axis C11 and a center axis C12 are matched with each other.

An inner diameter d4 of a portion of the cup holder 12 other than the retention plate 17 is set to be larger than the outer diameter d1 of the dummy cup 11. This is to ensure a gap into which the sealant 28 spills (squeezes out) as described later.

Chamfers 16b are formed around the retention hole 16 of the cup holder 12. When the chamfers 16b are formed, the cup holder 12 can be smoothly mounted to the dummy cup 11, and the sealant cup 13 can be smoothly mounted to the cup holder 12.

The height h2 of the cup holder 12 is set to be smaller than the height h1 of the dummy cup 11. This is to engage the cup holder 12 and the dummy cup 11 in the retention hole 16.

The cup holder 12 can be also made of a metal material such as aluminum alloy, or a resin material such as fluorine resin similarly to the dummy cup 11.

[Sealant Cup 13]

As shown in FIG. 1C, the sealant cup 13 is a cup-shaped member including the cavity 13a filled with the uncured sealant 28. In a third step, the sealant cup 13 is inserted into and mounted to the retention hole 16 of the cup holder 12 after the dummy cup 11 is removed.

An outer peripheral surface (a cylindrical surface) of the sealant cup 13 forms a guide surface that is guided along and supported by the guide surface 16a of the cup holder 12.

As described above, the sealant cup 13 has the outer diameter d3 equal to the inner diameter d2 of the retention hole 16 in the cup holder 12. To ensure release properties for the sealant, and to cause the sealant 28 to easily squeeze out, the sealant cup 13 is, for example, made of fluorine resin having low rigidity.

The cavity 13a of the sealant cup 13 has a sufficient volume for forming the sealant layer 29 having a required thickness around the collar 26 and the shank portion 25a exposed from the collar 26 (a portion where insulation is required).

The sealant layer 29 to be formed needs to have a sufficient thickness in consideration of shrinkage of the sealant by 10% to 20% of the thickness when the sealant layer is cured, and various manufacturing tolerances. However, when the sealant layer 29 is set to a thickness larger than the required thickness, the total weight of the aircraft is increased, thereby affecting fuel consumption. Thus, the outer diameter of the cavity 13a of the sealant cup 13 is preferably set to a diameter determined according to a following procedure. First, a thickness obtained by adding a value of 10% to 20% of the required thickness to the required thickness of the sealant layer is calculated. Subsequently, a thickness twice as large as the above thickness is calculated. Lastly, a value obtained by adding the outer diameter of the fastener member 24 and various manufacturing tolerances to the thickness calculated as above is calculated, and the value is employed as the outer diameter of the cavity 13a.

To be more specific, when the required sealant thickness is 2.5 mm, a value twice as large as a value obtained by adding 20% of the required thickness is 6.0 mm. A manufacturing tolerance of 1.0 mm and a maximum tolerance of the washer position from the fastener body position are added to 6.0 mm. The value obtained as above is employed as the outer diameter of the cavity 13a.

A depth h4 of the cavity 13a is preferably set to a depth obtained by (1)+(2)+(3):
(1) the projecting length of the fastener body 25,
(2) the thickness obtained with 10% to 20% of the required thickness added to the required thickness of the sealant layer, and
(3) tolerances of the projecting length of the fastener body 25 and the depth h4 of the cavity 13a.

The diameter of the cavity 13a is increased toward the opening portion in accordance with the outer shape of the fastener member 24. Thus, a bottom portion 18 of the sealant cup 13 is thin. If the bottom portion 18 is thick, a footprint of the sealant cup 13 becomes larger. Thus, a larger flat portion is correspondingly required in an inner surface of the reinforcement structural member 22. It is then necessary to make the reinforcement structural member 22 larger than required in structural design, thereby increasing the weight of the aircraft. Therefore, it is more preferable that the bottom portion 18 is thinner. However, if the bottom portion 18 is too thin, the sealant cup 13 is easily deformed, so that the sealant layer 29 having a desired thickness may not be formed, and it also becomes difficult to perform an operation of feeding the sealant as described below. The thickness of the bottom portion 18 is preferably set to 0.5 mm to 2.0 mm.

A height h3 of the sealant cup 13 is also set to be greater than the height h2 of the cup holder 12. This is to engage the cup holder 12 and the sealant cup 13 in the retention hole 16.

The steps for forming the sealant layer 29 around the fastener member 24 by using the dummy cup 11, the cup holder 12, and the sealant cup 13 are described by reference to FIGS. 2A to 4B.

[First Step: FIGS. 2A and 2B]

In the first step, the dummy cup 11 is mounted to the fastener member 24 that projects from the surface of the reinforcement structural member 22 (FIG. 2B). At this point, the fastener member 24 and the dummy cup 11 are mutually guided by moving the guide surface 15a formed on the body 11a of the dummy cup 11 along the inclined side surface of the collar 26 having a conical frustum shape. The fastener member 24 (the shank portion 25a) and the dummy cup 11 are mutually determined in position such that a center axis C24 and the center axis C11 are accurately matched with each other.

[Second Step: FIGS. 3A and 3B]

In the second step, the retention hole 16 of the cup holder 12 and the dummy cup 11 mounted to the fastener member 24 are roughly aligned with each other. The cup holder 12 is then lowered such that the dummy cup 11 passes through the retention hole 16.

As shown in FIG. 3A, the guide surface 16a of the cup holder 12 is moved along the outer peripheral surface of the dummy cup 11, so that the cup holder 12 and the dummy cup 11 are mutually guided. The cup holder 12 is lowered until a lower end of the cup holder 12 comes into contact with the surface of the reinforcement structural member 22. After that, displacement of the cup holder 12 is prevented. The displacement is effectively prevented by providing an adhesive, e.g., adhesive silicone between the cup holder 12 and the reinforcement structural member 22.

Since the outer diameter d1 of the dummy cup 11 is equal to the inner diameter d2 of the retention hole 16 in the cup holder 12, the fastener member 24 (the shank portion 25a) and the cup holder 12 are mutually determined in position such that the center axis C24 and the center axis C12 are accurately matched with each other.

The chamfers 16b are formed around the retention hole 16. When the dummy cup 11 is inserted into (mounted to) the retention hole 16 of the cup holder 12 in the second step, the chamfer 16b on the lower side in the drawing functions as a guide, thereby smoothly mounting the dummy cup 11.

Subsequently, the dummy cup 11 is removed while maintaining the relative position of the cup holder 12 to the fastener member 24 (FIG. 3B). The cup holder 12 remains to be determined in position coaxially with the fastener member 24.

Figure 4B:
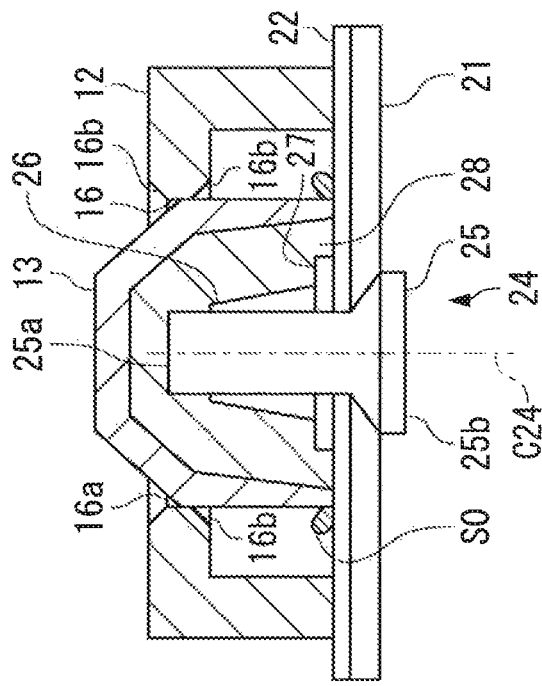

[Third Step: FIGS. 4A and 4B]

As shown in FIG. 4A, in the third step, the sealant cup 13 filled with the sealant 28 is mounted to the cup holder 12 instead of the removed dummy cup 11. That is, the sealant cup 13 is pushed into the retention hole 16 after being aligned with the retention hole 16 of the cup holder 12 above the retention hole 16. The sealant cup 13 is lowered while being guided along the guide surface 16a, so that the fastener member 24 is covered with the sealant 28.

The chamfers 16b are formed around the retention hole 16. Thus, when the sealant cup 13 is inserted into the cup holder 12, the chamfer 16b on an upper side in the drawing functions as a guide, thereby smoothly mounting the sealant cup 13.

As the sealant 28, a high-viscosity polysulfide polymer material generally used for a fillet seal or a fastener seal within a thick tank, e.g., PR-1776M B-2 Class B Low Weight Fuel Tank Sealant manufactured by PRC-Desoto Inc. is used. It is preferable to use a sealant with few voids therein as the sealant 28.

Since the sealant cup 13 has the outer diameter d3 equal to the diameter of the retention hole 16, the fastener member 24 and the sealant cup 13 are mutually determined in position such that the center axis C24 and a center axis C13 are accurately matched with each other. Therefore, the sealant 28 can cover a region around the portion to be insulated (the collar 26 and the shank portion 25a exposed therefrom) with a required thickness for ensuring the lightning protection capability in the cavity 13a of the sealant cup 13.

Here, in the third step, the sealant 28 is fed into the cavity 13a by such an amount that the sealant 28 spills (squeezes out) from between the surface of the reinforcement structural member 22 and a lower edge of the sealant cup 13 (reference character SO in FIG. 4A). The sealant 28 is basically fed until the cavity 13a is fully filled. However, a great amount of sealant may squeeze out depending on the shape of the fastener member 24 on which the sealant layer 29 is formed. Thus, the amount of the sealant 28 may be appropriately reduced. When reduced too much, the amount may not reach a required amount for forming the sealant layer 29, causing generation of voids. Thus, a reference line may be formed inside the cavity 13a in advance so as to indicate an appropriate amount for filling.

When the sealant cup 13 is overlaid on the fastener member 24, the sealant cup 13 is pushed with an interval between the cavity 13a and the fastener member 24 evenly maintained. Thus, the sealant 28 fed in the sealant cup 13 is supplied while being pushed out parallel to an axial direction of the fastener member 24 evenly around the fastener member 24. Therefore, the sealant 28 is quite unlikely to trap air therein from around the sealant 28. Generation of voids due to inclusion of air is thereby suppressed in the final sealant layer 29.

When the squeeze out SO is formed over the entire periphery of a rim portion of the sealant cup 13, it means that the sealant 28 spreads to the entire periphery of the fastener member 24. It is thus possible to visually determine that the sealant 28 spreads to the entire periphery of the fastener member 24 so as to prevent the generation of voids by confirming the formation of the squeeze out SO.

Since the bottom portion 18 of the sealant cup 13 is thin, the squeeze out is easily formed. When the sealant cup 13 is made of the fluorine resin having relatively low rigidity, the squeeze out is more easily formed.

Lastly, after a lapse of at least a time length (tack free time) in which the sealant 28 is cured such that its surface is not deformed even when touched (tack free), the cup holder 12 and the sealant cup 13 are removed (FIG. 4B).

If the sealant cup 13 is removed before the lapse of the tack free time, the surface of the sealant 28 having low hardness is easily damaged or a foreign object is easily attached thereto. In the present embodiment, the sealant cup 13 is removed after the lapse of at least the tack free time.

A unique number (product serial number, figure number, etc.) for identifying the sealant cup 13 may be stamped on an inner surface of the cavity 13a of the sealant cup 13. Then, the unique number can be marked on a surface of the formed sealant layer 29. Configuration management of the sealant layer 29 can be thereby enabled after forming.

The diameter of the cavity 13a is increased toward the opening. The sealant cup 13 is thereby easily removed.

It is necessary to appropriately set the height h1 of the dummy cup 11, the height h2 of the cup holder 12, and the height h3 of the sealant cup to required values for obtaining the required mount states in the aforementioned series of steps.

Next, effects of the present embodiment in which the sealant layer 29 is formed by the first step to the third step are described.

In accordance with the present embodiment, the center axes can be matched with each other only by mounting the dummy cup 11 to the fastener member 24, the cup holder 12 to the dummy cup 11, and the sealant cup 13 to the cup holder 12 in the first step to the third step. As a result, the center axis of the sealant cup 13 and the center axis of the fastener member 24 can be matched with each other. Therefore, the sealant layer 29 having a required thickness can be quickly and accurately formed around the portion to be insulated (the collar 26 and the shank portion 25a exposed therefrom).

In the third step, the sealant cup 13 filled with the sealant 28 is overlaid on the fastener member 24 from above. Then, air around the fastener member 24 is pushed out of the sealant cup 13 by the pressure of the sealant 28. The sealant layer 29 having few voids generated by air can be thereby formed. Therefore, the lightning protection capability of the fastener member 24 can be ensured by the sealant layer 29 according to the present embodiment.

In the present embodiment, the sealant cup 13 is removed after the lapse of at least the tack free time. Thus, the sealant layer 29 does not lose its shape in the middle of curing. Damage or attachment of foreign objects to the surface of the sealant layer 29 is thereby suppressed.

Second Embodiment

A present embodiment provides another example of the dummy cup, and means for forming the sealant layer by use of a cup holder that can be used even in a narrow space. The present embodiment also provides means for further suppressing the generation of voids by use of two types of sealants. In the following, differences from the first embodiment described above are mainly described.

In the second embodiment, a sealant 28A having low viscosity and a sealant 28B having higher viscosity than the sealant 28A are used as the sealant 28. The sealant 28 in the first embodiment corresponds to the sealant 28B having higher viscosity. A low-viscosity polysulfide polymer material generally used for a brush seal within a tank, e.g., PS-890A-2 Class A Fuel Tank Sealant manufactured by PRC-Desoto Inc. may be used as the sealant 28A.

Figures 5A, 5B, 5C, 5D:
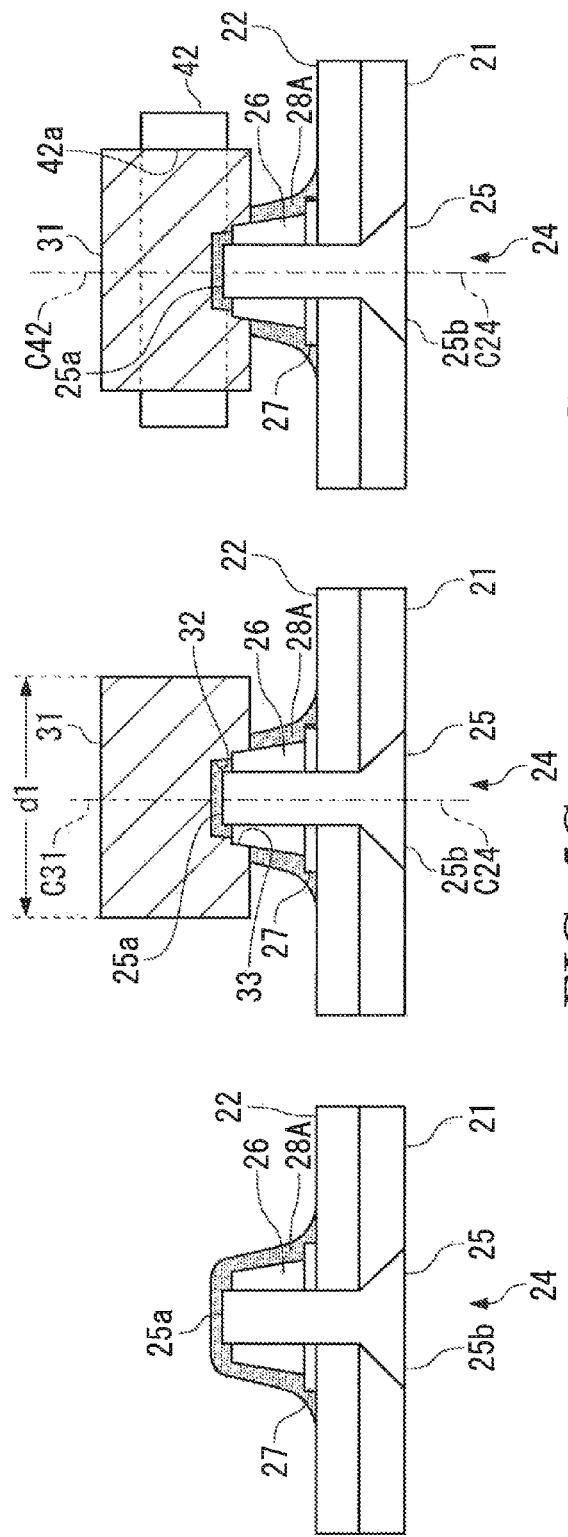
FIGS. 5A to 5D are views for explaining a second embodiment.

As shown in FIGS. 5C and 5D, a dummy cup 31 used in the second embodiment includes an airspace 32 and an airspace 33. The airspace 32 avoids contact with the shank portion 25a in response to the use of the sealant 28A, and the airspace 33 limits contact with the collar 26 to a portion of an upper end portion of the collar 26. An outer diameter d1 of the dummy cup 31 is set to be equal to an inner diameter d2 of a holder body 42 (a guide surface 42a) of a cup holder 41 described below.

As shown in FIG. 5A, the cup holder 41 includes a support base 43, and the holder body 42 connected to the support base 43 by a movable arm 44. The holder body 42 includes the guide surface 42a composed of an arc surface having a radius of curvature of d2/2 and a center angle of 180°.

The movable arm 44 is connected to the support base 43 by a fixture 48 so as to be vertically movable. The holder body 42 is rotatably connected to the movable arm 44 by a fixture 47. Therefore, the holder body 42 can be adjusted to any circumferential position about the fixture 47 as its center axis and any height.

Steps for forming the sealant layer 29 around the fastener member 24 by using the cup holder 41 and the dummy cup 31 according to the second embodiment are described by reference to FIGS. 5A to 6C.

[Zero Step: FIG. 5B]

First, in a zero step, the sealant 28A is applied to a region around the fastener member 24 by using a brush (FIG. 5B). At this point, the sealant 28A is applied to a region within a range of about the outer diameter of the sealant cup 13.

[First Step: FIG. 5C]

As shown in FIG. 5C, in a first step, the dummy cup 31 is mounted to the fastener member 24 to which the sealant 28A has been applied similarly to the operation in the first step described in the first embodiment. The center axis C24 of the fastener member 24 (the shank portion 25a) and a center axis C31 of the dummy cup 31 are matched with each other by mounting the dummy cup 31 as described above.

In the mount state, the side wall at a distal end of the collar 26 is in contact with the dummy cup 31 in the airspace 33. A distal end surface of the collar 26 is abutted against a stepped surface formed in a boundary portion between the airspace 32 and the airspace 33. That is, the dummy cup 31 contacts the collar 26 only in a limited portion. Thus, the sealant 28A is removed only in a narrow region when the dummy cup 31 is mounted. This is to leave the sealant 28A in as wide as possible region around the collar 26 since the sealant 28A acts as a lubricant for the sealant 28B as described below.

[Second Step: FIG. 5D]

As shown in FIG. 5D, in a second step, the guide surface 42a of the holder body 42 of the cup holder 41 is moved along an outer peripheral surface of the dummy cup 31. The cup holder 41 is then fixed so as not to be displaced. Since the cup holder 41 includes the support base 43, the support base 43 may be fixed.

Since the outer diameter d1 of the dummy cup 31 is equal to the inner diameter d2 of the holder body 42, the center axis C24 of the fastener member 24 (the shank portion 25a) and a center axis C42 of the holder body 42 can be matched with each other (FIG. 5D).

The dummy cup 31 is then removed with the cup holder 41 fixed. The fastener member 24 and the cup holder 41 remain arranged coaxially with each other.

Figure 6A:
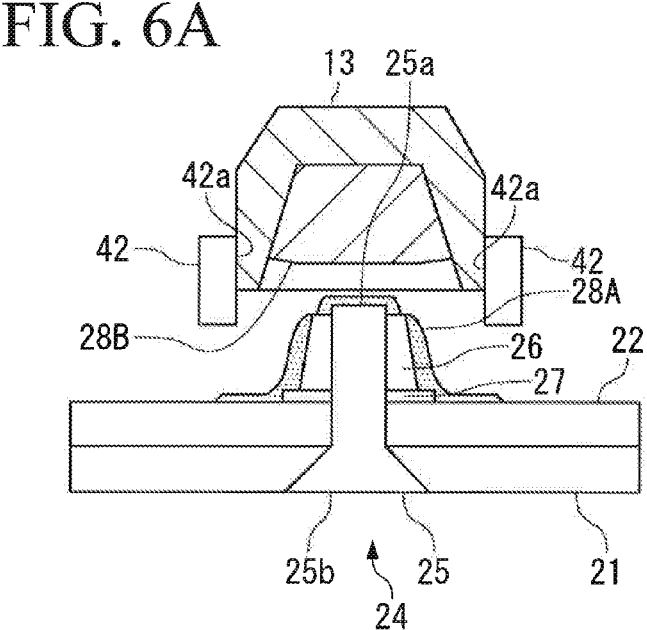
FIGS. 6A to 6C are sectional views for explaining the second embodiment.
Figure 6B:
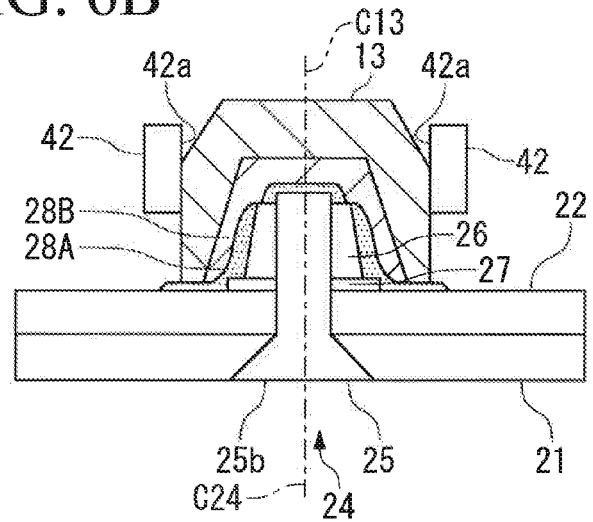
Figure 6C:
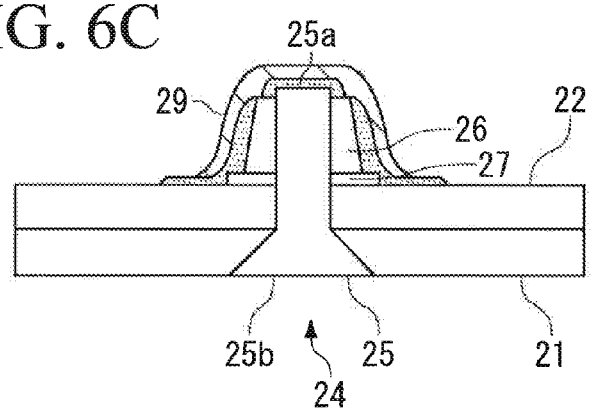

[Third Step: FIGS. 6A to 6C]

In a third step, the sealant cup 13 filled with the sealant 28B is mounted to the cup holder 41 instead of the removed dummy cup 31 (FIG. 6A). That is, the sealant cup 13 is pushed toward the fastener member 24 with the outer peripheral surface of the sealant cup 13 moved along the guide surface 42a of the cup holder 41. The sealant cup 13 is mounted to the fastener member 24 with the outer peripheral surface mutually guided along the guide surface 42a. The sealant 28B thereby covers the sealant 28A. The center axis C24 of the fastener member (the shank portion 25a) and the center axis C13 of the sealant cup 13 can be also matched with each other.

Lastly, after the sealant 28A and the sealant 28B become tack-free, the cup holder 41 and the sealant cup 13 are removed.

The sealant layer 29 can be formed around the fastener member 24 by the aforementioned series of steps.

The present embodiment provides a following effect in addition to the same effects as those of the first embodiment.

The holder body 42 of the cup holder 41 supports only half of the outer periphery of the dummy cup 31 and the outer periphery of the sealant cup 13. Thus, the holder body 42 occupies only a small region, so that the cup holder can be used even when the fastener member 24 is arranged in a narrow space.

Since the holder body 42 can be adjusted to any direction and height, the cup holder can be applied to a wide range.

Although the arc guide surface 42a has a center angle of 180°, the center angle may be smaller than 180°, or exceed 180°. The center angle is preferably larger than 180° so as to stably support the dummy cup 31 and the sealant cup 13.

Since the two sealants having different viscosity are used in the second embodiment, the following effects can be also produced.

That is, when the sealant 28A is applied in advance, the sealant 28A easily flows in the vicinity of the fastener member 24, and also fills a depression, if any, in the surface of the fastener member 24 since the sealant 28A is pushed out by the sealant 28B. Moreover, since the sealant 28A acts as a lubricant, the sealant 28B can flow so as to slide on the surface of the sealant 28A. The sealant 28A and the sealant 28B are thus unlikely to trap air therein, so that the generation of voids can be suppressed.

The method for forming the sealant layer 29 by using the two types of sealants as described above may be also applied to the first embodiment.

The viscosity of the sealant 28A is appropriately selected so as to obtain the aforementioned action and effect.

Although the present invention has been described based on the first embodiment and the second embodiment, the dummy cup, the cup holder, and the sealant cup are not limited to the aforementioned forms as long as their functions can be fulfilled.

For example, the dummy cup may contact only a portion of the collar 26 and the shank portion 25a exposed therefrom so as to match the center axis with the center axis of the fastener member 24. As long as a dummy cup includes a guide surface in contact with a portion of the side surface of the collar 26 or a guide surface in contact with the side surface of the exposed shank portion 25a, the dummy cup sufficiently functions as the dummy cup of the present invention. A portion of the collar 26 includes both an axial portion of the collar 26, and a circumferential portion of the collar 26. The same applies to the cup holder and the sealant cup.

The outer shape of the dummy cup and the sealant cup, and the retention hole of the cup holder are not limited to the circular shape. For example, a rectangular shape may be employed. In the case of the rectangular shape, however, the dummy cup and the sealant cup cannot be mutually mounted to the cup holder unless they are aligned around the axis. In the case of the circular shape, alignment around the axis is not required.

In the present invention, the form of the fastener member 24 is not limited. Although the example in which the side surface of the collar 26 is tapered is described, the present invention may be applied to a collar having an axially constant outer diameter, for example.

The constitutions described in the embodiment described above may be also freely selected or appropriately changed into other constitutions without departing from the scope of the present invention.

What is claimed is:

1. A method for producing a lightning protection fastener with an insulating sealant layer, the lightning protection fastener comprising:
    a fastener member that passes through and fastens a plurality of members constituting an airframe of an aircraft; and
    an insulating sealant layer that is formed around the fastener member,
    with a jig comprising:
    a sealant cup that overlays a sealant to be stored in a cavity on the fastener member;
    a cup holder that includes a guide for determining a position of the sealant cup with respect to the fastener member; and
    a dummy cup that determines a position of the cup holder with respect to the fastener member,
    performing the method comprising:
    a first step of mounting the dummy cup to the fastener member;
    a second step of mounting the cup holder to the dummy cup by moving the guide along the dummy cup; and
    a third step of mounting the sealant cup to the fastener member so as to overlay the sealant on the fastener member while moving the sealant cup along the guide of the cup holder after removing the dummy cup with a relative position of the cup holder to the fastener member maintained.

2. The method according to claim 1, wherein a sealant is fed into the cavity of the sealant cup in advance before the third step.

3. The method according to claim 1, wherein before the first step, the fastener member is coated with another sealant having lower viscosity than the sealant to be fed into the sealant cup.

* * * * *

UNITED STATES PATENT AND TRADEMARK OFFICE
CERTIFICATE OF CORRECTION

PATENT NO.         : 9,475,587 B2                             Page 1 of 1
APPLICATION NO.    : 14/165734
DATED              : October 25, 2016
INVENTOR(S)        : Wataru Nishimura et al.

It is certified that error appears in the above-identified patent and that said Letters Patent is hereby corrected as shown below:

In the Specification

Column 6, Line 36, "determined in position and retained by using a cup holder" should read --determined in position and retained by using a cup holder 12--.

Column 12, Line 60, "center axis C24 of the fastener member" should be --center axis C24 of the fastener member 24--.

Signed and Sealed this
Twenty-first Day of February, 2017

Michelle K. Lee
*Director of the United States Patent and Trademark Office*